W. A. BARROWS.
PLOW-FENDERS.
No. 183,361. Patented Oct. 17, 1876.
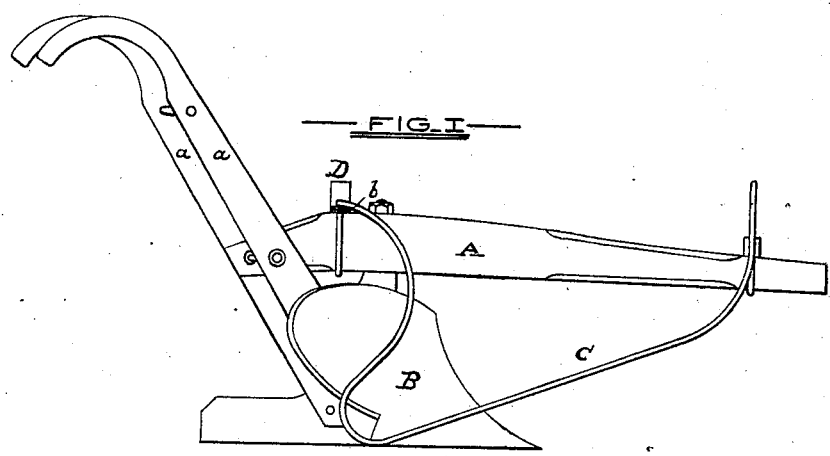
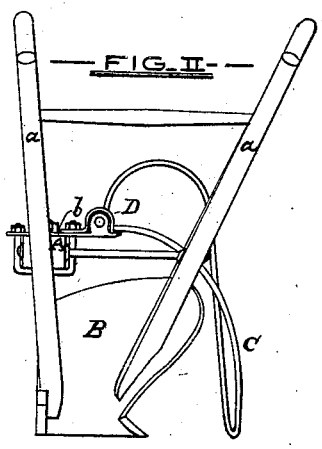
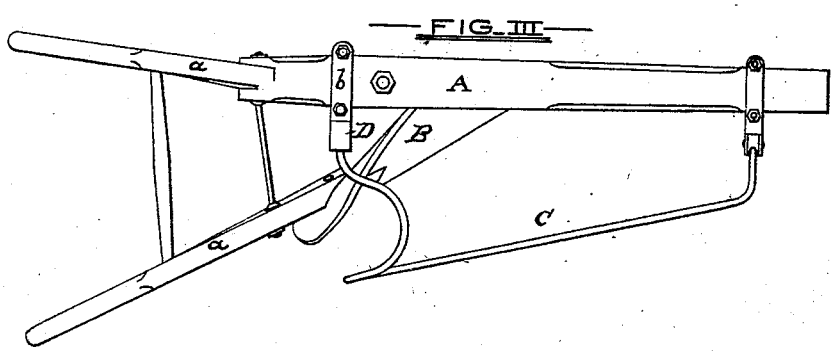
WITNESSES:
W. W. Wharton
H. A. Daniels
INVENTOR:
Walter A. Barrows,
by G. H. & W. T. Howard,
Attys

UNITED STATES PATENT OFFICE.

WALTER A. BARROWS, OF SYCAMORE, ILLINOIS.

IMPROVEMENT IN PLOW-FENDERS.

Specification forming part of Letters Patent No. 183,361, dated October 17, 1876; application filed March 30, 1876.

*To all whom it may concern:*

Be it known that I, WALTER A. BARROWS, of Sycamore, in the county of De Kalb and State of Illinois, have invented certain new and useful Improvements in Plows, of which the following is a specification; and I do hereby declare that in the same is contained a full, clear, and exact description of my said invention, reference being had to the accompanying drawing and to the letters of reference marked thereon.

My invention relates to an attachment to plows to be used in plowing where corn-stalks, weeds, or grass need to be plowed under; and consists in an adjustable rod or guide of peculiar construction attached to the plow-beam, as hereinafter described, and adapted, by the inclination of its operative portion, and its relative position with regard to the plow-share and mold-board, to come into contact with and turn down the grass, &c., in such manner as to admit of its being covered by the earth when turned over by the plowshare or mold-board.

In the further description of my invention which follows, due reference must be had to the accompanying drawing, forming a part of this specification, and in which—

Figure 1 is a side view of a plow fitted with my invention; Fig. 2 an end view, and Fig. 3 a plan, of the same.

Similar letters of reference indicate similar parts in all the figures.

A is the plow-beam, having the handles *a* at the rear end thereof, and B the plowshare or mold-board, secured to the plow-beam in the usual manner. C is the adjustable rod or guide before alluded to, the ends of which are pivoted to clamps *b* rigidly attached to the plow-beam. The clamps consist of plates placed transversely of the plow-beam, and secured thereto by means of staples which pass around the plow-beam, and are drawn tightly to it by means of nuts. D is a lock or locking device secured to one of the clamps, *b*, to limit the movement of the adjustable rod C in an upward direction to suit the character of grass, &c., to be plowed under and the depth of the furrow.

In plowing, the grass, corn-stalks, &c., come into contact with the inclined bar or rod C, and, as the plow is forced forward, are bent down until they are in a position to be covered by the earth as turned over by the mold-board.

The rod C, near the point of its attachment to the forward end of the plow-beam, is arched, as shown particularly in Fig. 2, which construction enables it to receive the grass, &c., while the divergence of the said rod laterally from the beam, as seen in Fig. 3, carries the grass, &c., under by bowing the same.

I am aware that adjustable rods have been applied to plows with the view of accomplishing the object here sought to be attained, and therefore I do not claim said rod, except when constructed and combined as herein shown.

Having thus described my invention, what I claim as new, and wish to secure by Letters Patent of the United States, is—

The pivoted rod C, constructed to arch outward from the forward end of the plow-beam, and to incline downward and outward from said beam, and hinged, as shown, to the rear end thereof, combined with the said beam, the clamps *b*, and locking device D, substantially as and for the purpose herein specified.

In testimony whereof I have hereunto subscribed my name this 6th day of January, in the year of our Lord 1876.

WALTER A. BARROWS.

Witnesses:
H. A. JONES,
J. L. PRATT.